Feb. 9, 1960 A. J. W. M. VAN OVERBEEK 2,924,723
PHASE DIFFERENCE DETECTOR OR FREQUENCY DEMODULATOR
Filed March 28, 1955

INVENTOR
ADRIANUS JOHANNES WILHELMUS
MARIE VAN OVERBEEK
BY
AGENT

2,924,723

PHASE DIFFERENCE DETECTOR OR FREQUENCY DEMODULATOR

Adrianus Johannes Wilhelmus Marie van Overbeek, Eindhoven, Netherlands, assignor, by mesne assignments, to North American Philips Company, Inc., New York, N.Y., a corporation of Delaware Application March 28, 1955, Serial No. 497,296

Claims priority, application Netherlands March 26, 1954

4 Claims. (Cl. 307—88.5)

The invention relates to circuit arrangements for detecting the phase difference between two electric oscillations, for example for demodulating a frequency modulated signal from which the said oscillations are derived so as to exhibit a phase difference dependent upon the frequency modulation.

A known arrangement of this kind comprises an electron tube having two control grids to which the two said oscillations are supplied so that the anode current of this tube is a measure of the said phase difference and more particularly corresponds with the said frequency modulation. Preferably the amplitude of the said electric oscillations is made such that the said anode current is substantially independent of any amplitude variations of these oscillations. The anode circuit of the tube, however, cannot readily be made suitable for connection to an amplifier having a low input impedance, for example a transistor.

It is an object of the invention to provide a circuit arrangement having a similar effect which is very suited for use in combination with transistors. It is characterized by a current source the current of which is supplied to three parallel branches each comprising a rectifier, the said two oscillations being supplied to two of these branches so that the current in the third branch is a measure of the phase difference between the two oscillations. According to a further feature of the invention the rectifier included in the said third branch forms part of the output circuit of a transistor.

Figure 1:
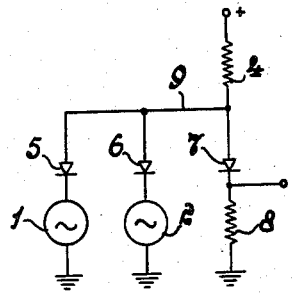
Figure 2:
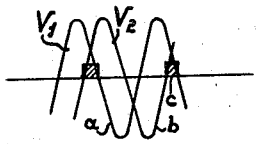
Figure 3:
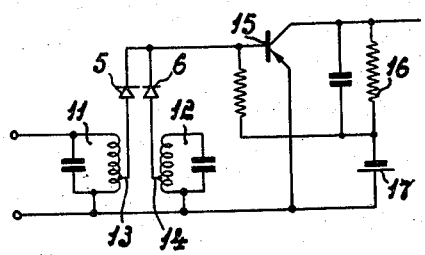

The invention will now be described more fully with reference to the accompanying diagrammatic drawing, in which Fig. 1 shows an embodiment of a circuit arrangement in accordance with the invention, Fig. 2 shows voltage versus time diagrams to illustrate Fig. 1, and Fig. 3 is a modification of a circuit arrangement of the kind shown in Fig. 1 for demodulating frequency modulated oscillations.

The circuit arrangement shown in Fig. 1 comprises two sources of oscillations 1 and 2 the phase difference of which is required to be detected. For this purpose the current from a source of positive potential is supplied via a resistor 4 to three parallel branches comprising rectifiers 5, 6 and 7 respectively, the sources 1 and 2 being included in the first and second branch respectively, whilst the third branch includes an output resistor 8 which is small in value compared with that of the resistor 4 and across which the detection product is set up.

In Fig. 2 the voltages of the sources 1 and 2 are designated $V_1$ and $V_2$. During the phase $a$ in which the voltage $V_1$ is negative the rectifier 5 will be conductive so that a conductor 9 becomes negative with respect to earth with the result that the rectifiers 6 and 7 are rendered non-conductive. During the phase $b$ in which the voltage $V_2$ is more negative than the voltage $V_1$ the rectifier 6 becomes conductive whereas the rectifiers 5 and 7 are rendered non-conductive due to the negative voltage set up at the conductor 9.

Only during the phase $c$ in which both voltages $V_1$ and $V_2$ are positive the rectifier 7 becomes conductive whereas the rectifiers 5 and 6 are rendered non-conductive, assuming the voltage drop across the resistor 8 to be small. In this event the full current of the source + flows via the resistor 4 and the rectifier 7 through the output resistor 8 (this is shown by shading in Fig. 2). Its amplitude is substantially independent of the amplitudes of the voltages $V_1$ or $V_2$ whilst the time during which it flows is proportional to the phase difference between the voltages $V_1$ and $V_2$ so that the mean current through the resistor 8 is a measure of the said phase difference.

Fig. 3 shows a circuit arrangement for demodulating frequency modulated oscillations which are supplied to one of two approximately critically coupled circuits 11 and 12 across tappings 13 and 14 respectively of which voltages are set up exhibiting a phase difference which is dependent upon the frequency modulation. These voltages are in turn supplied to two parallel circuits including the rectifiers 5 and 6 respectively whilst in this event the rectifier 7 included in the third parallel branch in Fig. 1 forms part of the input circuit between the emitter and the base of a transistor 15 across the output filter 16 of which the modulated signal is consequently set up. The source 17 which corresponds with the source of positive potential in Fig. 1 can also act to feed the collector of the transistor 15.

Since the rectifiers 5 and 6 impose an unequal load upon the circuits 11 and 12, the output signal across the filter 16 varies slightly with the amplitude of the frequency modulated input oscillations. If, now, the source 17 is caused to vary with the said amplitude, for example by rectification of these input oscillations (not shown), the said variations of the output signal can be reduced or even suppressed.

What is claimed is:

1. A circuit for demodulating a frequency modulated signal comprising means to derive from said signal two oscillations of the same frequency and having a mutual phase difference dependent upon the frequency of said signal, a source of current, three parallel connected circuits, resistance means serially connected between said source of current and said parallel connected circuits, each of said parallel connected circuits including rectifier means connected to permit current flow in the same direction through said resistance means, means connected to supply said two oscillations respectively to two of said three parallel connected circuits, and output circuit means connected to the third one of said parallel connected circuits.

2. A circuit as claimed in claim 1, in which the rectifier in said third circuit comprises input electrodes of a transistor.

3. A circuit as claimed in claim 2, in which said transistor comprises an output electrode, and including means connected to derive from said output electrode a signal which is a representation of the modulation of said frequency-modulated signal.

4. A circuit for demodulating a frequency modulated signal comprising a source of frequency modulated signals, tuned circuit means having a primary winding approximately critically coupled to a secondary winding, means connecting said source of signals to said secondary winding, a source of current, three parallel connected circuits, resistance means serially connected between said source of current and said parallel connected circuits, each of said parallel connected circuits including rectifier means connected to permit current flow in the same direction through said resistance means, one of said parallel circuits including at least a portion of said primary winding, another of said parallel circuits including at least a portion of said secondary winding, and output circuit means connected to the third one of said parallel connected circuits.

References Cited in the file of this patent

UNITED STATES PATENTS

| | | | |
|---|---|---|---|
| 2,476,323 | Rack | July 19, | 1949 |
| 2,597,575 | Dome | May 20, | 1952 |
| 2,636,133 | Hussey | Apr. 21, | 1953 |
| 2,657,318 | Rack | Oct. 27, | 1953 |
| 2,670,445 | Felker | Feb. 23, | 1954 |
| 2,713,117 | Haegele | July 12, | 1955 |
| 2,758,208 | Grayson | Aug. 7, | 1956 |
| 2,765,115 | Beloungie | Oct. 2, | 1956 |
| 2,771,552 | Lynch | Nov. 20, | 1956 |
| 2,773,181 | Singel | Dec. 4, | 1956 |
| 2,798,152 | Janssen | July 2, | 1957 |
| 2,804,578 | Bergseth | Aug. 27, | 1957 |